(12) United States Patent
Sejersen et al.

(10) Patent No.: US 10,075,484 B1
(45) Date of Patent: Sep. 11, 2018

(54) SHARABLE CLIPS FOR DIGITAL PUBLICATIONS

(71) Applicant: ISSUU, Inc., Palo Alto, CA (US)

(72) Inventors: Christian Mulvad Sejersen, Frederiksberg (DK); Tav Klitgaard, Copenhagen (DK); Jeremy James LaCroix, San Francisco, CA (US)

(73) Assignee: ISSUU, INC., Palo Alto, CA (US)

( * ) Notice: Subject to any disclaimer, the term of this patent is extended or adjusted under 35 U.S.C. 154(b) by 162 days.

(21) Appl. No.: 14/657,831

(22) Filed: Mar. 13, 2015

Related U.S. Application Data

(60) Provisional application No. 61/952,708, filed on Mar. 13, 2014.

(51) Int. Cl.
*G06F 3/0484* (2013.01)
*H04L 29/06* (2006.01)
*G06F 17/30* (2006.01)

(52) U.S. Cl.
CPC ........ *H04L 65/403* (2013.01); *G06F 3/04842* (2013.01); *G06F 17/3089* (2013.01); *G06F 17/30265* (2013.01)

(58) Field of Classification Search
CPC ................................................. G06F 3/04842
USPC .............................................. 715/753
See application file for complete search history.

(56) References Cited

U.S. PATENT DOCUMENTS

| | | |
|---|---|---|
| 6,219,679 B1 | 4/2001 | Brisebois et al. |
| 6,658,662 B1 * | 12/2003 | Nielsen .................... H04N 7/16 348/E7.054 |
| 6,976,210 B1 | 12/2005 | Silva et al. |
| 7,130,861 B2 | 10/2006 | Bookman et al. |
| 7,519,573 B2 | 4/2009 | Helfman et al. |
| 7,912,705 B2 | 3/2011 | Wasson et al. |
| 7,962,846 B2 | 6/2011 | Lerner et al. |
| 8,255,820 B2 | 8/2012 | Rivlin et al. |
| 8,332,424 B2 | 12/2012 | Flynn et al. |

(Continued)

OTHER PUBLICATIONS

Google, definition of the word "specify", retrieved on Jan. 24, 2018, available at <https://www.google.com/search?q=define%3A+specifying &rlz=1C1GGRV_enUS768US768&oq=define%3A+specifying&aqs= chrome..69i57j69i58.7733j0j7&sourceid=chrome&ie=UTF-8>, 1 page.*

(Continued)

*Primary Examiner* — Reza Nabi
*Assistant Examiner* — Daniel Rodriguez
(74) *Attorney, Agent, or Firm* — Haynes Beffel & Wolfeld LLP

(57) ABSTRACT

Roughly described, a system includes a database containing publications, and a server coupled to the database. Each publication in the publication database contains images on various pages. The server is programmed to serve toward a user a page from a selected publication. The user can select a clip region to share, and the clip region can be any desired portion of the page, including a part of an image. The server then writes to the publication database the location of the clip region, and a version of the image cropped to the clip region. The server will also share the clip on a sharing service upon selection by the user. The user can also comment on the clip, and the server writes the comment into the publication database in association with the clip. The clip is discoverable by other users, both on the server website and on the sharing service.

25 Claims, 11 Drawing Sheets

(56) References Cited

U.S. PATENT DOCUMENTS

| | | | | |
|---|---|---|---|---|
| 8,352,573 | B2 * | 1/2013 | Chandra | G06F 17/30899 709/218 |
| 8,558,808 | B2 | 10/2013 | Forstall et al. | |
| 8,582,801 | B2 | 11/2013 | Goto et al. | |
| 8,666,961 | B1 * | 3/2014 | Qureshi | G06F 17/30312 707/705 |
| 8,756,519 | B2 * | 6/2014 | Hunt | G06F 17/30861 715/760 |
| 8,799,273 | B1 * | 8/2014 | Chang | G06F 17/3089 707/722 |
| 9,141,591 | B2 * | 9/2015 | Pereymer | G06F 17/2247 |
| 9,396,485 | B2 * | 7/2016 | Freishtat | G06Q 30/02 |
| 2001/0054085 | A1 * | 12/2001 | Kurganov | G06F 3/167 709/218 |
| 2002/0184648 | A1 * | 12/2002 | Delpuch | H04N 7/17309 725/112 |
| 2005/0165839 | A1 * | 7/2005 | Madan | G06F 17/242 |
| 2007/0044013 | A1 * | 2/2007 | Hyatt | H04M 1/72522 715/239 |
| 2007/0266011 | A1 * | 11/2007 | Rohrs | G06F 17/30867 |
| 2007/0266342 | A1 * | 11/2007 | Chang | G06F 17/30867 715/810 |
| 2008/0162356 | A1 | 7/2008 | Parket et al. | |
| 2008/0168388 | A1 * | 7/2008 | Decker | G06F 3/0481 715/800 |
| 2008/0201452 | A1 * | 8/2008 | Athas | H04L 29/12594 709/219 |
| 2008/0294981 | A1 * | 11/2008 | Balzano | G06F 17/21 715/256 |
| 2008/0307297 | A1 | 12/2008 | Ohlenbusch et al. | |
| 2009/0158176 | A1 * | 6/2009 | Kalaboukis | G06F 17/3089 715/758 |
| 2009/0164883 | A1 * | 6/2009 | Decker | G06F 17/3089 715/234 |
| 2009/0172517 | A1 | 7/2009 | Kalicharan | |
| 2009/0254631 | A1 * | 10/2009 | Jain | G06F 3/0481 709/217 |
| 2009/0327294 | A1 * | 12/2009 | Bailor | G06F 17/24 |
| 2010/0318893 | A1 * | 12/2010 | Matthews | G06F 17/241 715/230 |
| 2011/0099071 | A1 * | 4/2011 | Johnson | G06Q 30/02 705/14.64 |
| 2011/0125512 | A1 | 5/2011 | Huang | |
| 2011/0184960 | A1 | 7/2011 | Delpha et al. | |
| 2011/0258535 | A1 * | 10/2011 | Adler, III | G06F 17/214 715/235 |
| 2012/0005567 | A1 * | 1/2012 | Burckart | G06F 3/1454 715/234 |
| 2012/0023447 | A1 * | 1/2012 | Hoshino | G06F 17/2735 715/823 |
| 2012/0030553 | A1 | 2/2012 | Delpha et al. | |
| 2012/0066580 | A1 * | 3/2012 | Sukman | G06F 17/30011 715/230 |
| 2012/0066584 | A1 * | 3/2012 | Jung | G06F 17/30902 715/234 |
| 2012/0084634 | A1 * | 4/2012 | Wong | G06F 17/241 715/233 |
| 2012/0131002 | A1 * | 5/2012 | Rakshit | H04L 67/10 707/736 |
| 2012/0151383 | A1 * | 6/2012 | Kazan | G06Q 10/101 715/753 |
| 2012/0204101 | A1 * | 8/2012 | Yoshida | G06F 3/0484 715/246 |
| 2012/0278718 | A1 * | 11/2012 | Esaka | G06F 17/30899 715/719 |
| 2012/0311509 | A1 * | 12/2012 | Maggiotto | G06F 3/04817 715/863 |
| 2013/0013684 | A1 * | 1/2013 | Miller | G06Q 10/10 709/204 |
| 2013/0042200 | A1 | 2/2013 | Armitage | |
| 2013/0054613 | A1 | 2/2013 | Bishop | |
| 2013/0097481 | A1 * | 4/2013 | Kotler | G06F 17/241 715/230 |
| 2013/0097490 | A1 * | 4/2013 | Kotler | G06F 17/21 715/255 |
| 2013/0124978 | A1 * | 5/2013 | Horns | G06F 17/241 715/243 |
| 2013/0132455 | A1 * | 5/2013 | Mangini | G06Q 10/10 709/201 |
| 2013/0132814 | A1 * | 5/2013 | Mangini | G06F 17/24 715/230 |
| 2013/0132886 | A1 * | 5/2013 | Mangini | G06Q 10/10 715/781 |
| 2013/0159936 | A1 * | 6/2013 | Yamaguchi | G06F 3/0485 715/850 |
| 2013/0247221 | A1 * | 9/2013 | Victor | H04L 63/10 726/28 |
| 2014/0020005 | A1 * | 1/2014 | Amselem | H04N 21/44008 725/19 |
| 2014/0032481 | A1 * | 1/2014 | Lang | G06F 17/30011 707/607 |
| 2014/0033068 | A1 * | 1/2014 | Gupta | G06Q 10/103 715/751 |
| 2014/0040070 | A1 * | 2/2014 | Pereymer | G06F 17/2247 705/26.8 |
| 2014/0047332 | A1 * | 2/2014 | Liu | G06F 17/24 715/273 |
| 2014/0053061 | A1 * | 2/2014 | Chasen | G06F 17/2247 715/234 |
| 2014/0067702 | A1 * | 3/2014 | Rathod | G06Q 10/10 705/319 |
| 2014/0067934 | A1 * | 3/2014 | Ware | G06Q 50/01 709/204 |
| 2014/0089775 | A1 * | 3/2014 | Worsley | G06F 17/30575 715/230 |
| 2014/0101527 | A1 * | 4/2014 | Suciu | G06F 17/218 715/230 |
| 2014/0118800 | A1 * | 5/2014 | Hwang | H04N 1/00331 358/474 |
| 2014/0122991 | A1 * | 5/2014 | Achillopoulos | G06F 17/2785 715/230 |
| 2014/0129639 | A1 * | 5/2014 | Burge | H04L 51/32 709/204 |
| 2014/0192081 | A1 * | 7/2014 | Jin | G06K 9/80 345/625 |
| 2014/0282069 | A1 * | 9/2014 | Canetti | H04L 67/06 715/748 |
| 2014/0344722 | A1 * | 11/2014 | Patterson | G06Q 30/02 715/753 |
| 2015/0007104 | A1 * | 1/2015 | Zhu | G06F 3/0486 715/802 |
| 2015/0046827 | A1 * | 2/2015 | Akselrod | G06F 21/6218 715/738 |
| 2015/0113395 | A1 * | 4/2015 | Kim | G06F 3/0482 715/273 |
| 2015/0195095 | A1 * | 7/2015 | Gillead | H04L 12/1822 726/7 |
| 2015/0205869 | A1 * | 7/2015 | Green | G06F 17/30864 707/726 |
| 2016/0216862 | A1 * | 7/2016 | Turner | G06F 3/0488 |
| 2016/0246484 | A1 * | 8/2016 | Kim | G06F 3/04817 |
| 2016/0274771 | A1 * | 9/2016 | Seong | G06F 3/048 |
| 2016/0307351 | A1 * | 10/2016 | Zhang | G06T 11/60 |

OTHER PUBLICATIONS

Rodriguez et al., "The convergence of digital libraries and the peer-review process." Journal of Information Science 32.2 (2006), 12 pages.

Phelps et al., "Multivalent documents: Inducing structure and behaviors in online digital documents." In System Sciences, 1996., Proceedings of the Twenty-Ninth Hawaii International Conference on,, vol. 5, pp. 144-152. IEEE, 1996.

Jaschke et al., "Organizing Publications and Bookmarks in BibSonomy." in CKC. 2007, 4 pages.

(56) References Cited

OTHER PUBLICATIONS

Dudchuk et al., "Ontos clip and share," Proceedings of the 6th International Conference on Semantic Systems. ACM, 2010, 2 pages.
Walsh, "Facebook Open Graph META Tags," https://web.archive.org/web/20110429065857/https:/davidwalsh.name/facebook-meta-tags, accesed May 4, 2018, 2 pages.

* cited by examiner

SHARABLE CLIPS FOR DIGITAL PUBLICATIONS

CROSS-REFERENCE TO OTHER APPLICATIONS

This application claims priority to U.S. Provisional Application No. 61/952,708, filed 13 Mar. 2014, by Christian Sejersen, which application is incorporated by reference herein.

BACKGROUND

The invention relates generally to new collaborative opportunities arising from the recently available ability to deliver digital publications on the web.

It has become commonplace to view a wide variety of documents on the web, and to "share" them with others by means of various social media platforms such as Facebook® and Pinterest®. Sharing of documents provides opportunities for collaboration among numerous users, all of whom have an opportunity to add comments about the shared item, which others can see and build upon. Many websites now include a built-in set of icons by which a user can initiate a sharing operation. For example, if a user selects an icon for sharing on Facebook, a dialog comes up that permits the user to share the web page currently being viewed, or a particular element of the web page identified by URL, on the user's Facebook account. The ability to share only a particular element of a web page, rather than the entire page, can be useful for example if the web page is a composite of different elements which in some sense have independent significance to the user. This may occur, for example, on news websites, where many news stories are headlined and the user is interested in sharing only a particular story. Typically the sharing icon has previously been associated with the element to be shared. The user cannot usually share an element or portion of an element that does not already have an associated sharing icon, at least not without a cumbersome workaround.

Certain kinds of web pages do not lend themselves to easy sharing via social media. These include digitally published magazines, which often are designed to mimic the look and feel of a paper magazine, and often contain on each page an image element occupying the entire page. These kinds of publications have become available in this format only recently. In these publications, because of the size of the images, often the smallest element that can be shared is the size of a full page. Such an element can be cumbersome on a social network, where it is desirable to display the element itself (optionally with comments), among many other items shared or re-shared by the same user or others. Some websites address the problem of large elements by providing to the sharing service not the entire element, but rather a brief description of the element and perhaps a thumbnail. But this work-around can be inadequate for many purposes.

An opportunity therefore exists for improving the collaboration among users with respect to digital publications containing very large images. Better collaboration, leading to conversations of greater social, economic or scientific value, may result.

SUMMARY

Roughly described, a system is provided which includes a publication database containing publications, and a computer server coupled to the publication database. The publication database includes a variety of publications, each of which contains images on various pages. The server is programmed to serve toward a user a page from a selected publication. The user can select a clip region to share, and the clip region can be any desired portion of the page, including a part of an image (i.e. smaller than the full image). The server then writes to the publication database the location of the clip region, and a version of the image cropped to the clip region. The server will also share the clip on a sharing service upon selection by the user. The user can also comment on the clip, and the server writes the comment into the publication database in association with the clip. The clip is discoverable by other users, both on the server website and on the sharing service.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
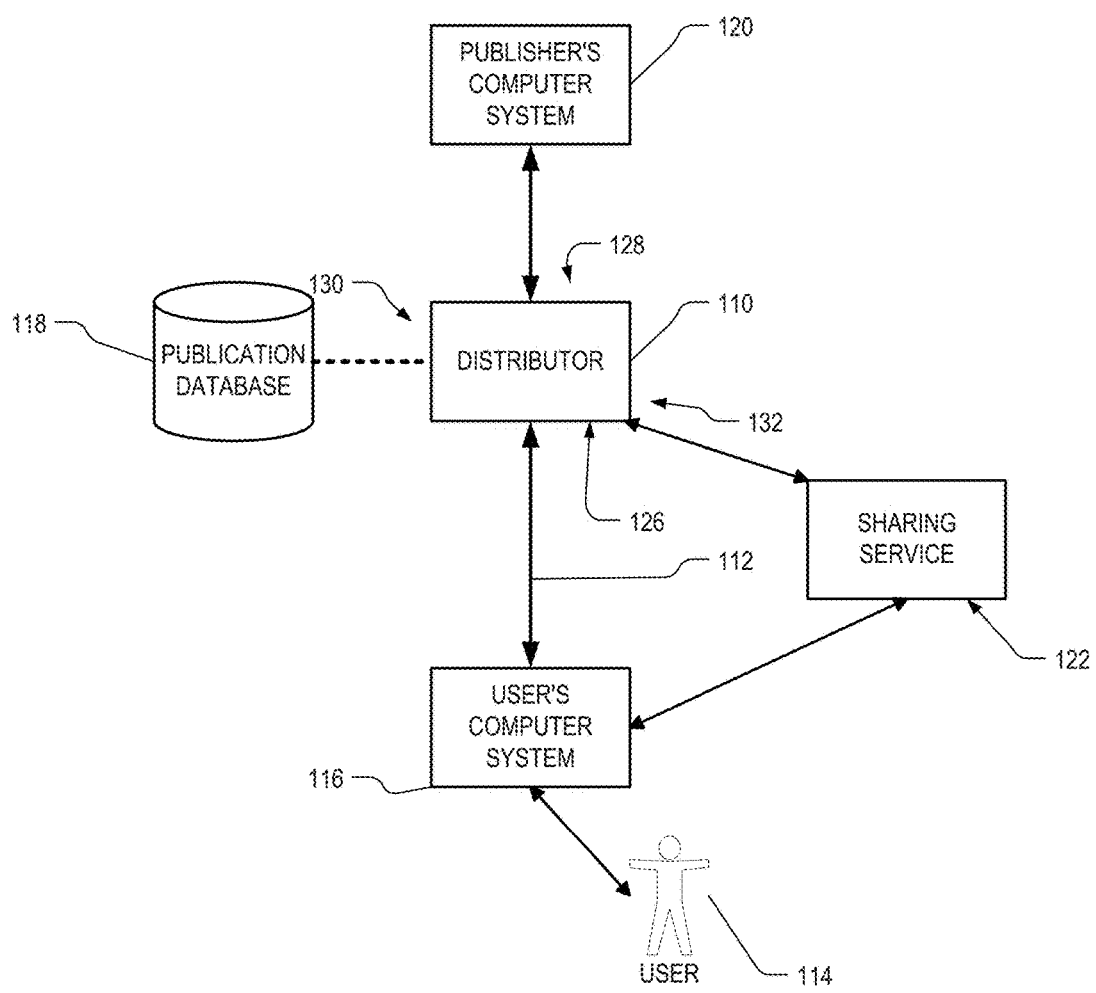
FIG. 1 illustrates a system incorporating aspects of the invention.

FIG. 1 illustrates a system incorporating aspects of the invention. It includes three roles, namely a distributor operating a distributor system 110, a user 114 operating a user system 116, and a publisher operating a publisher's computer system 120. As used herein, these roles include others acting on behalf of the entity, as well as successors-in-interest and assigns. For example, "publisher" includes Media Agents. In addition the system includes a sharing service 122. The sharing service 122 may be a server complex operated by a social networking entity such as Facebook or Pinterest. In general, it can be any computer system that allows users to share items found on websites.

The distributor system 110 has a publication database 118, accessible to the distributor computer system 110 via a database interface 130. The publication database 118 stores the publications and other information, including digital magazines containing images and sharable clips defined by users and/or publishers. The user 114 accesses publications via the distributor's user-facing web interface 126 using computer system 116 and browser software, both of which may be conventional in various embodiments. Alternatively the user's computer system 116 may run dedicated software, such as a smartphone app, for accessing publications via the distributor's user-facing web interface 126. Other variations will be apparent to the reader. Communication link 112 coupling the distributor system 110 with the user system 116 may be any communications network, such as the Internet.

Similarly, the publisher's computer system 120 accesses (and uploads) publications to the distributor computer system via the distributor's publisher-facing web interface 128, using computer system 120 and browser or dedicated software. The communication link by which the publisher system 120 communicates with the distributor system 110 may be any communications network, such as the Internet.

The sharing service 122 communicates with the distributor system 110 via the distributor's sharing service interface 132, and a network such as the internet. The user 114 also may access the sharing service 122 directly via the user's computer system 116 and a network such as the internet.

Figure 2:
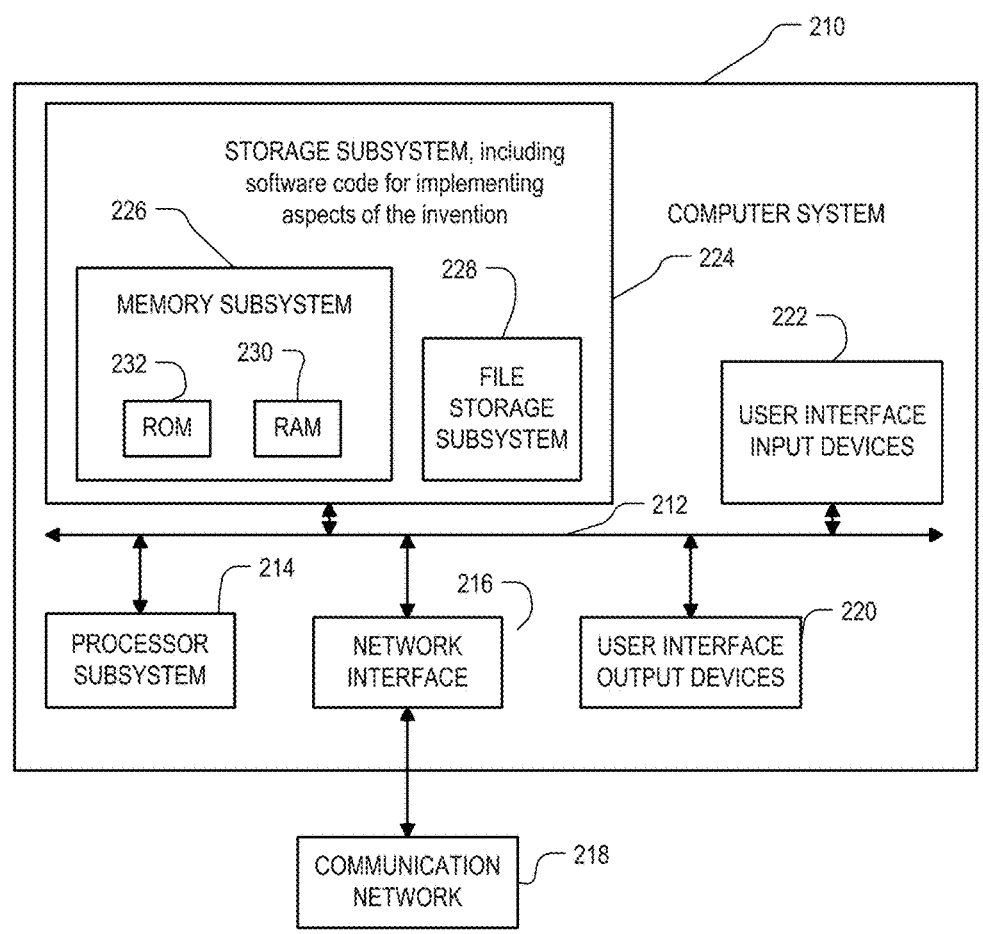
FIG. 2 is a simplified block diagram of a computer system that can be used to implement the functions performed by many of the computer systems in FIG. 1.

FIG. 2 is a simplified block diagram of a computer system 210 that can be used to implement the functions performed by the distributor system 110, the user system 116, the publisher's computer system 120, and the sharing service computer system 122 in FIG. 1.

Computer system 210 typically includes a processor subsystem 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. For example, communication network 218 may be, or be coupled with, communication link 112. Communication network 218 may comprise many interconnected computer systems and communication links. These communication links may be wireline links, optical links, wireless links, or any other mechanisms for communication of information, but typically it is an IP-based communication network. While in one embodiment, communication network 218 is the Internet, in other embodiments, communication network 218 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210 or onto computer network 218.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system.

Storage subsystem 224 stores the basic programming and data constructs that provide the functionality of certain embodiments of the present invention. For example, the various modules implementing the functionality of certain embodiments of the invention may be stored in storage subsystem 224. These software modules are generally executed by processor subsystem 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD ROM drive, an optical drive, or removable media cartridges. When computer system 210 represents the distributor system 110, the publication database 118 may be stored in the storage subsystem 224, or it may be stored in a separate facility accessible to the distributor system 110 via communication network 218. The databases and modules implementing the functionality of certain embodiments of the invention may have been provided on a computer readable medium such as one or more CD-ROMs, and may be stored in a non-transitory manner by file storage subsystem 228. The host memory 226 contains, among other things, computer instructions which, when executed by the processor subsystem 214, cause the computer system to operate or perform functions as described herein. As used herein, processes and software that are said to run in or on "the host" or "the computer", execute on the processor subsystem 214 in response to computer instructions and data in the host memory subsystem 226 including any other local or remote storage for such instructions and data.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 itself can be of varying types including a personal computer, a portable computer, a workstation, a computer terminal, a network computer, a television, a mainframe, a server farm, or any other data processing system or user device. Due to the ever-changing nature of computers and networks, the description of computer system 210 depicted in FIG. 2 is intended only as a specific example for purposes of illustrating the preferred embodiments of the present invention. Many other configurations of computer system 210 are possible having more or less components than the computer system depicted in FIG. 2.

Figure 3:
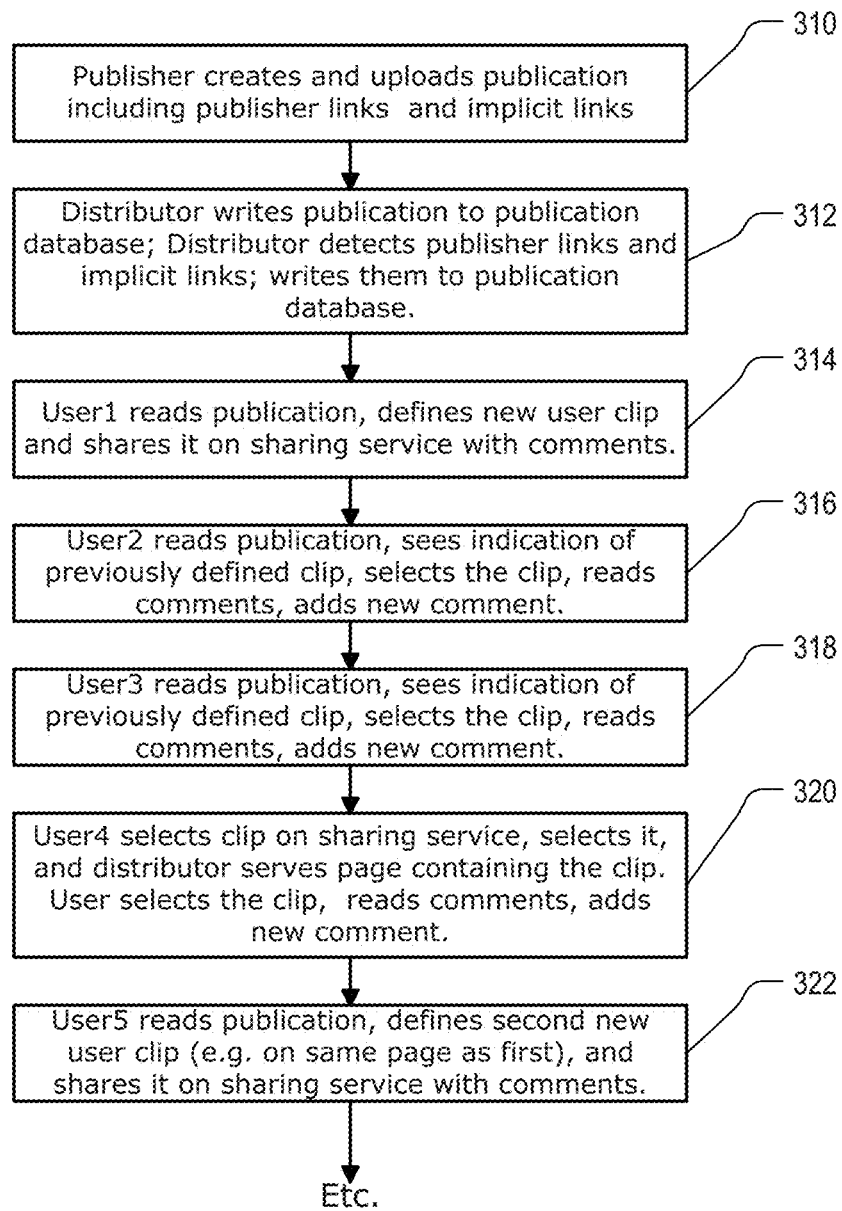
FIG. 3 is a flow chart providing an overview of an example of a sequence with which the system of FIG. 1 can be operated.

FIG. 3 is a flow chart providing an overview of an example of a sequence with which the system of FIG. 1 can be operated. In step 310, the publisher creates and uploads a publication which contains publisher-defined links and implicit links. The publisher-defined links can be inserted into the document by the publisher, for example using a program provided by the distributor, or using tools on the distributor's publisher-facing website. The implicit links are text strings in the document that have attributes of a conventional URL, such as by starting with the letters "http" followed by a colon and two slashes; or by starting with the letters "www", followed by a dot, some more text, a dot, and the letters of a commonly used top-level domain. In one embodiment an implicit URL must be in text form in order to be detected by the distributor 110, whereas in another embodiment the distributor 110 has the ability to OCR text that is as embedded in an image.

In step 312, the distributor 110 writes the publication to the publication database 118. It also subjects the publication to a conversion pipeline that extracts a range of artifacts from the publication. One of these artifacts is a list of URLs in the publication. These are detected and written into the publication database 118.

In step 314, a first user reads the publication, and decides to share something from the publication on a favorite social network. The user therefore uses tools on the distributor 110 user-facing website to define a new user clip and share it on the sharing service. The user also can optionally add comments to the clip, which are viewable by other users who find the clip in the publication.

In step 316, a second user reads the publication. When the distributor 110 serves pages from the publication toward the second user, the pages include an indication of the previously defined clip. The second user can select the clip, read any associated comments, and can add new comments if desired.

In step 318, a third user, like the second user, reads the publication, notices the indication of the previously defined clip, selects it, and reads any associated comments. At this point there are at least two comments to read: the one added by the first user and the one added by the second user. The third user now adds a third comment if desired.

In step 320, a fourth user, while browsing the sharing service, comes across the first user's share of the first clip. The fourth user is interested, and thus selects the clip. The reference to the clip on the sharing service site is hyperlinked to the publication page containing the clip, on the distributor system 110. Thus in response to selection of the clip by the fourth user, the user's computer system 116 sends a request to the distributor system 110, identifying the page. The distributor system 110 serves the page containing the clip. In an embodiment the hyperlink points directly to the cropped version of the clip stored in the publication database 118; but preferably the hyperlink points only to the page as a whole, in order that the user can see the context from which the clip was created. Once the fourth user receives the page, he or she may select the clip, read comments, and add a new comment as set forth above.

In step 322, a fifth user reads the publication. The fifth user (like the first user) decides to share something from the publication on a second sharing service (which may or may not be the same as the first sharing service). Whether or not having seen the first clip, the fifth user uses the tools on the distributor 110 user-facing website to define a new second user clip (e.g. on same page as first) and share it on the second sharing service. The fifth user also can optionally add comments to the second clip, which are viewable by other users who find the second clip in the publication. Note that a user could also re-share an existing clip on a different sharing service if desired, or on the same sharing service using a different account. Numerous variations on the above will be apparent to the reader. Note that the five users mentioned above need not all be different from each other; some or all of them could be repeat users.

Figure 4:
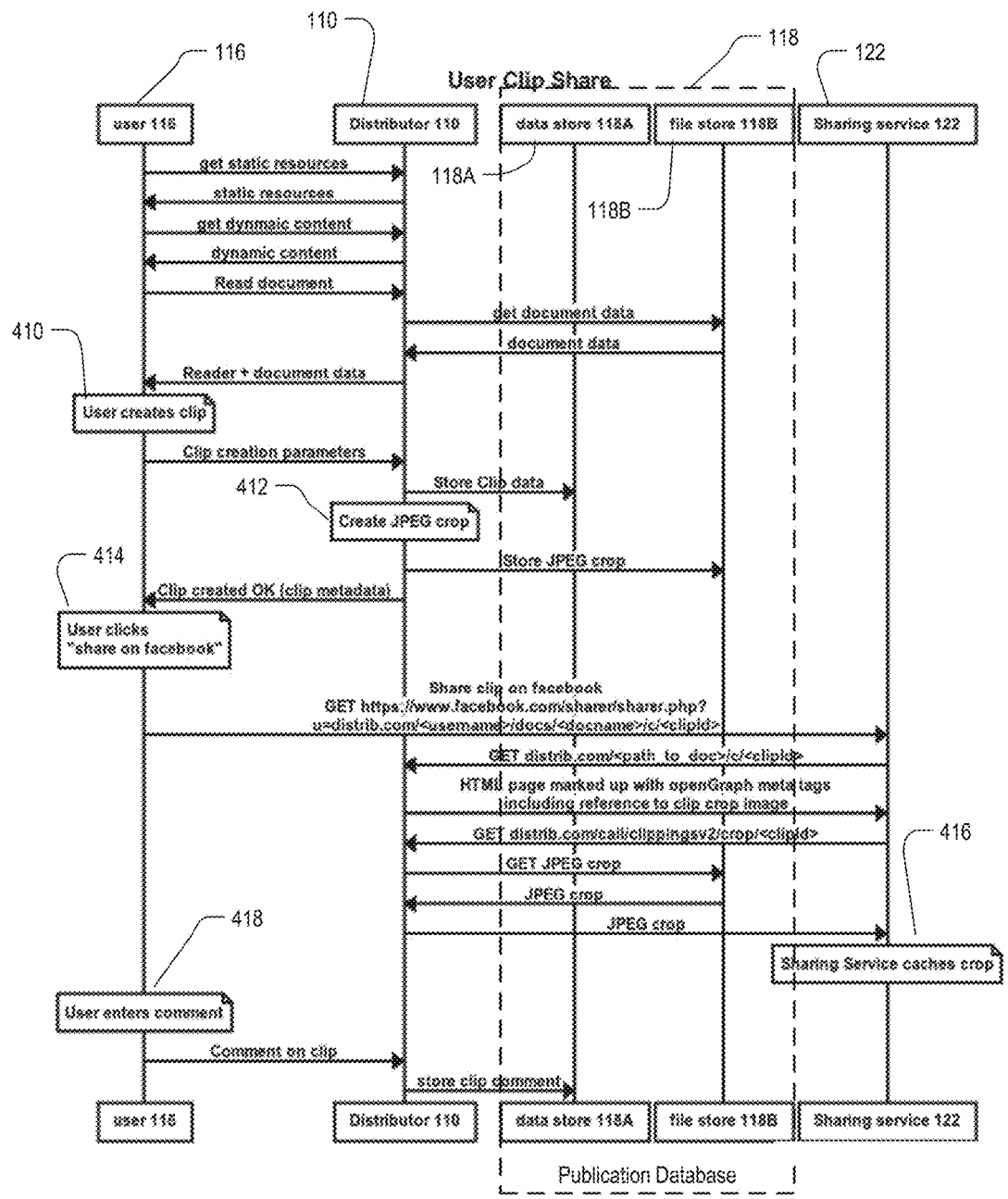
FIGS. 4, 5, 6 and 7 are sequence diagrams for implementing various steps in the flow chart of FIG. 3.

FIG. 4 is a sequence diagram for implementing any of steps 314, 316 or 322. The sequence diagrams herein illustrate sequences of messages passed among, as well some steps performed internally within, the various components of the system as identified at the top and bottom of each vertical line of the diagram. Each arrow incoming to the vertical line of a component (such as distributor 110) is received and processed by a module of software or hardware on the distributor 110 computer system. Similarly, each arrow outgoing from the vertical line of a component is prepared and sent by a module of software on the indicated component. Further, each box overlying the vertical line of a component represents a module of software or hardware in the component which performs the indicated function or step. As with all the flow charts herein, the logic indicated in a sequence diagram can be implemented using processors programmed using computer programs stored in memory accessible to the computer systems and executable by the processors, by dedicated logic hardware, including field programmable integrated circuits, and by combinations of dedicated logic hardware and computer programs.

Also as with all flowcharts herein, it will be appreciated that many of the steps in the flow charts and the sequence diagrams can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown. Still further, though the logic is described in the flow chart from the point of view of each of the actors, it will be appreciated that the distributor's computer system is configured specifically to initiate, support, allow or respond to the interactions that are described. The distributor's computer system is configured to perform specific operations in response to each such interaction.

Referring to FIG. 4, the user clip sharing process involves the user 114 (represented in FIG. 4 by the user's computer system 116), the distributor system 110, the publication database 118 (which in FIG. 4 is separated into a data store 118A and a file store 118B), and the sharing service 122. Initially, when the user opens a publication on the distributor 110 user-facing website, the user's computer system 116 first requests static resources and the distributor system 110 returns them. Static resources are the files which do not change often, and which are needed to make the website render. They include such items as the HTML code describing a frame around the publication, the distributor's logo, background colors, and so on. Next, the user's computer system 116 requests, and the distributor system returns, the dynamic content needed to render the web page. Dynamic content may include publication covers and other content that differs for different visitors or different visits.

Next, the user 116 makes a request to read a particular document, such as a publication. The distributor 110 receives the request, forwards it to the file store 118B, receives the document data from the file store 118B, and returns it to the user 116 with a reader program which enables the user interaction features of the publication. The reader program may be for example a small program written for JavaScript, flash, html, Android, or iOS, depending on the user's particular type of computer system and/or browser.

Next, in step 410, the user creates a clip. Using the clip creation tools on the distributor 110 user-facing interface, the user selects the desired clip area, and, when satisfied, clicks a "Create" button. Importantly, the clip area can be taken from anywhere on the page, including within an image, and can be smaller than the full image, and thus also smaller than the full page. In an embodiment in which each page is occupied fully by an image, the selected clip region preferably is smaller than the full page. In the embodiment of FIG. 4 only rectangular clip regions are supported, though in another embodiment clip regions of different shapes can be supported.

Figure 11:
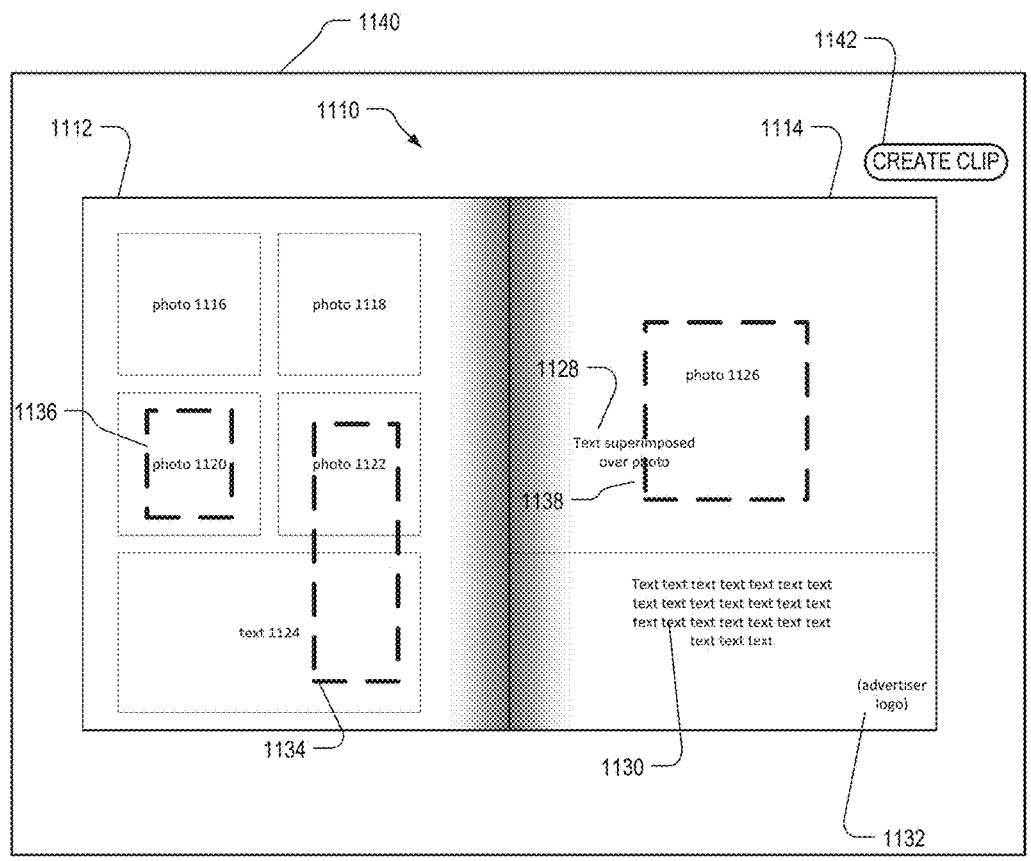
FIG. 11 is an illustration of an example spread in a publication in the publication database of FIG. 1.

FIG. 11 is an illustration of an example "spread" 1110 in a publication in the publication database 118. A "spread" in this embodiment constitutes two facing "pages", identified as 1112 and 1114. It should be noted that the pages are pages of the publication (e.g. a magazine), and neither a page nor the entire spread fills the entire "web page" 1140. Various controls or other information can be presented around the outside of the spread 1112, such as the Create Clip button 1142. Page 1112 contains five "elements": four photos (images) 1116, 1118, 1120 and 1122, plus one region 1124 of text. Page 1114 includes four elements: photo (image) 1126, text 1128 superimposed over the photo 1126, text 1130 in its own region, and an advertising logo 1132. The user is able to create a clip that is entirely within a page but smaller than the full page, as for example each of the clips identified as 1134, 1136 and 1138. Clip 1136, for example, is also entirely within an image but smaller than the full image. Clip 1134 covers portions of two different elements 1122 and 1124, but does not cover either of them completely. That is, clip 1134 excludes part of element 1122 and also excludes part of element 1124. Clip 1138 also covers portions of two different elements 1126 and 1128, but does not cover either of them completely. That is, clip 1134 excludes part of element 1126 and also excludes part of element 1128. Note that in the embodiment of FIG. 11, none of the clips shown were previously identified on the website as being sharable. For example, no "share this" icon is presented to the user. Another embodiment might include elements which are pre-designated as sharable, but that is not required in all embodiments.

The user's computer system 116 then sends clip creation parameters to the distributor system 110, which stores "clip data" in the data store 118A. The clip data includes such information as the creating user's ID, the publication page number from which the clip was selected, the X and Y coordinates of the top left corner of the clip, and the width and height of the clip. In step 412, the distributor system 110 also creates a cropped version of the page from which the clip was taken, the cropped version matching the position and size of the clip region. It stores the cropped version on the file store 118B, so that it is available for quick retrieval. The distributor system 110 then returns an OK with clip metadata back to the user system 116.

The cropped version is created by converting the clip region to an image, much like a screen shot. In one embodiment only the clip region is converted. In another embodiment the entire page or spread is converted and the resulting image is cropped to the clip region. Regardless of how the image is created, it is still referred to herein for convenience as a "cropped" version. That is, no actual step of "cropping" is necessary in order to form the version referred to herein as the "cropped" version.

In step 414, the user selects an icon on the distributor 110 user-facing website to share the newly created clip on a sharing service, such as Facebook. The user may select Facebook from among a variety of sharing services offered to the user by the distributor 110 website. In response, the reader program on the user computer system 116 uses the sharing service's API to share the clip. FIG. 4 uses Facebook as an example, but the process is similar for other services. First, a URL is created to point to the page from which the clip was taken. The URL may be of the form:

http:(slash)(slash)<distributor domain name> (dot) com/<username>/docs/<docname>/c/<clipId>, where <distributor> (dot) com is the distributor's domain name, <username> is the creating user's username on the distributor 110 website, <docname> is the name of the publication, and <clipId> is an identifier for the particular clip. Note that in this embodiment the URL identifies the publication page number from which the clip was taken, only implicitly. When sharing the clip on Facebook, this URL (without the http prefix) is appended as an argument to the end of a prescribed Facebook sharing API URL as follows:

https:(slash)(slash)www (dot) facebook (dot) com/sharer/sharer.php?u=

Facebook then asserts a GET using the supplied URL argument, and the distributor system 110 responds with an HTML page marked up with openGraph meta tags. These meta tags include a URL which identifies the previously stored cropped version of the clip image. Facebook then asserts a GET for the cropped image, the distributor system 110 obtains it from the file store 118B, and returns it to Facebook. In step 416, Facebook caches the cropped version of the clip image internally.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify". For example, typically an image (jpeg, for example) occupies an entire page of the publication, though in some embodiments it might occupy less than the entire page. In embodiments where it occupies less than an entire page, "identification" of a position on the page of a clipped region can be accomplished by identifying the position relative to the entire page, or by identifying the image within the page and further identifying the position relative to the image. Other ways of identifying the position on the page of a clipped region will be apparent.

In step 418, the user 116 enters a comment for the clip, using a tool on the distributor 110's user facing website. The distributor 110 writes the clip comment to the data store 118A in association with the clip.

Figure 5:
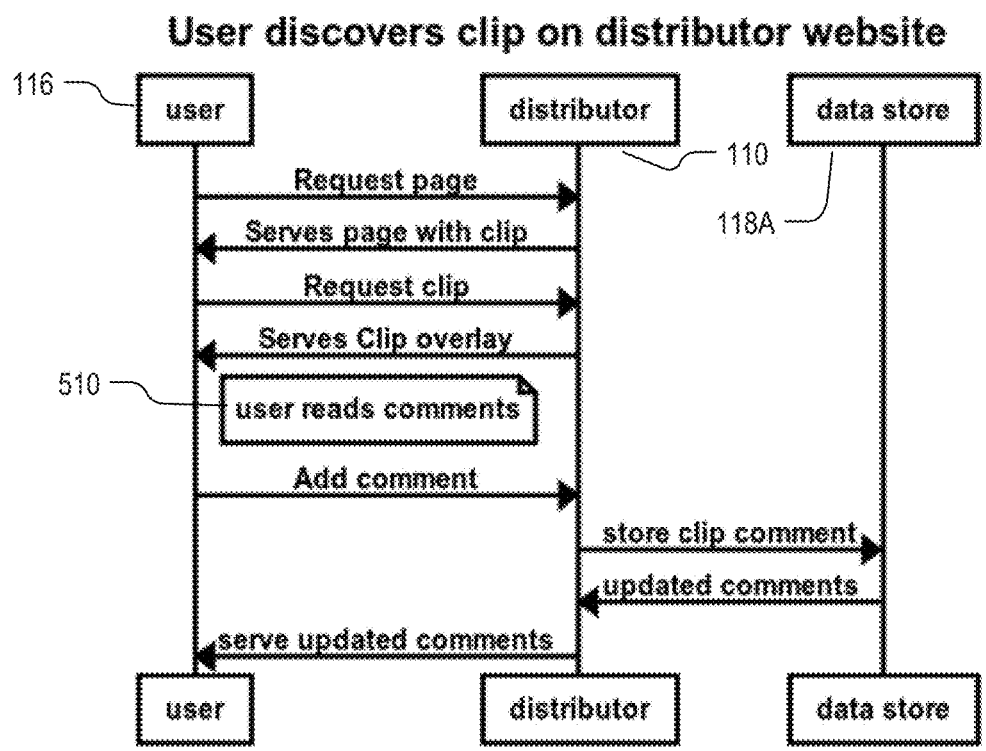

FIG. 5 is a sequence diagram for implementing step 316, in which a second user discovers a clip on the distributor website and adds a new comment. Initially, while browsing publications on the distributor's user-facing website, the user system 116 requests a particular page. This might be in response to the user opening a new publication, or by turning the page in a publication, for example. In this example the requested page already includes a clip, and when the distributor 110 serves the requested page back to the user's computer system 116, it includes an indication that the clip is present. The reader program on the user computer 116 recognizes this and calls it to the attention of the user 114. The user 114 selects the clip and, in response, the user computer 116 requests the clip from the distributor system 110. The distributor system 110 returns a clip overlay, which the reader program presents to the user 114 as an overlay over the publication page, showing the clip image, comments that have been associated with the clip, and a number of control icons, among other things. In step 510 the user 114 reads the comments and enters a new comment to be added. In response, the user's computer 116 sends the add comment request to the distributor system 110, which writes it into the data store 118A in association with the clip. The distributor 110 retrieves the updated comments from data store 118A and serves them back to the user computer 116.

The distributor system 110 in the sequence of FIG. 5 need not necessarily register whether the request for the first clip came from a different user computer system than that of the user that created the clip, but objectively this usually can be determined from the IP address of the requestor as provided in header information in the request. The distributor system 110 is programmed to serve the requested clip toward whatever IP address is indicated in the header of the request. Thus it can be said that the request "points toward" the second user.

Figure 6:
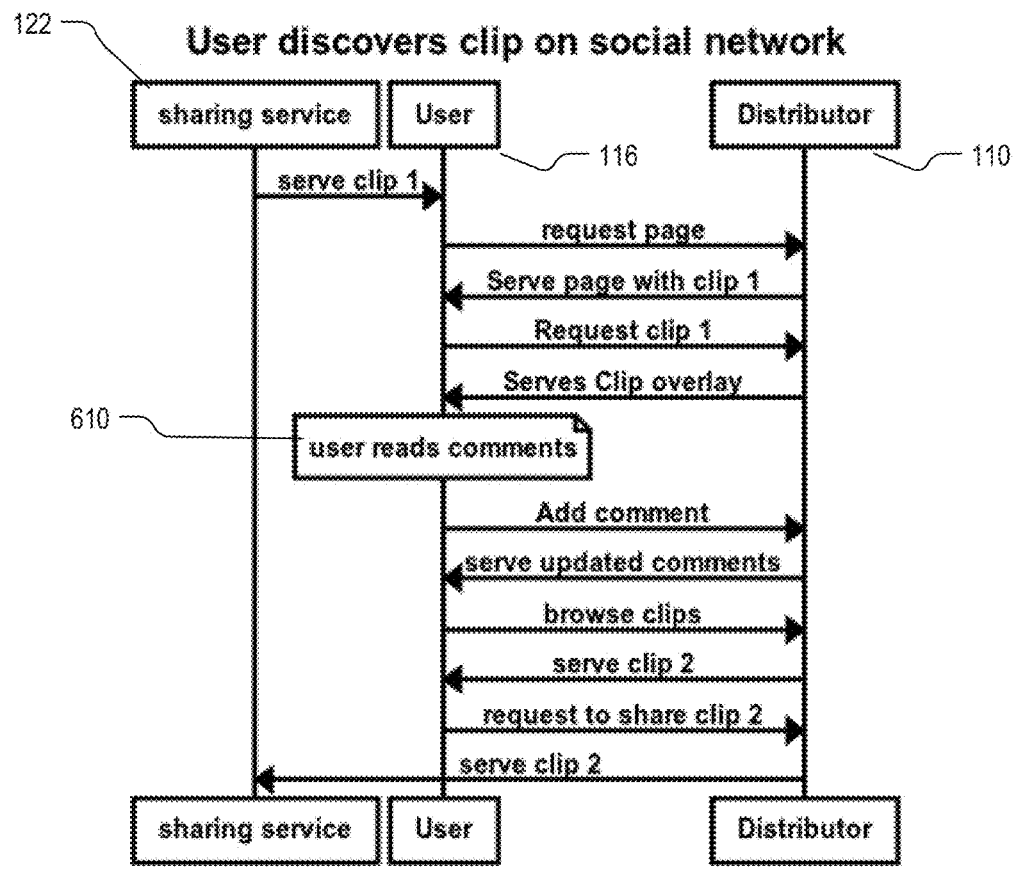

FIG. 6 is a sequence diagram for implementing step 320, in which a fourth user discovers a clip on the sharing service 122 and adds a new comment. Initially, while browsing the sharing service, the user 114 selects a clip that had been previously shared on the service. The sharing service 122 serves the clip to the user system 116, including the URL identifying the publication page from which the clip was taken. As previously mentioned, in an embodiment, this URL specifies only the publication and the clip ID, but since the distributor system 110 knows what page the identified clip came from in the specified publication, this URL also identifies the specific page implicitly. The user system 116 asserts the URL toward the distributor system 110, which returns the page containing the clip. As set forth with respect to FIG. 5, this page includes an indication that the clip is present. The distributor system 110 also sends (not shown) the reader program to the user system 116, which recognizes the presence of the clip and calls it to the attention of the user 114. The user 114 selects the clip and, in response, the user computer 116 requests (not shown) the clip from the distributor system 110. Again, this request identifies not only the desired clip, but also points back toward the fourth user. The distributor system 110 returns (not shown) a clip overlay toward the fourth user, which the reader program presents to the user 114 as an overlay over the publication page, showing the clip image, comments that have been associated with the clip, and a number of control icons, among other things. In step 610 the user 114 reads the comments and enters a new comment to be added. In response, the user's computer 116 sends the add comment request to the distributor system 110, which writes it into the data store 118A (not shown). The distributor system 110 retrieves the updated comments from data store 118A and serves them back to the user computer 116.

At this point the user is now browsing the distributor 110 user-facing website. As shown in FIG. 6, the user may now browse further publication clips, receive another clip overlay (for a clip 2), and request to share it on the same or different sharing service 122, in the same manner as set forth above with respect to FIG. 4.

Figure 7:
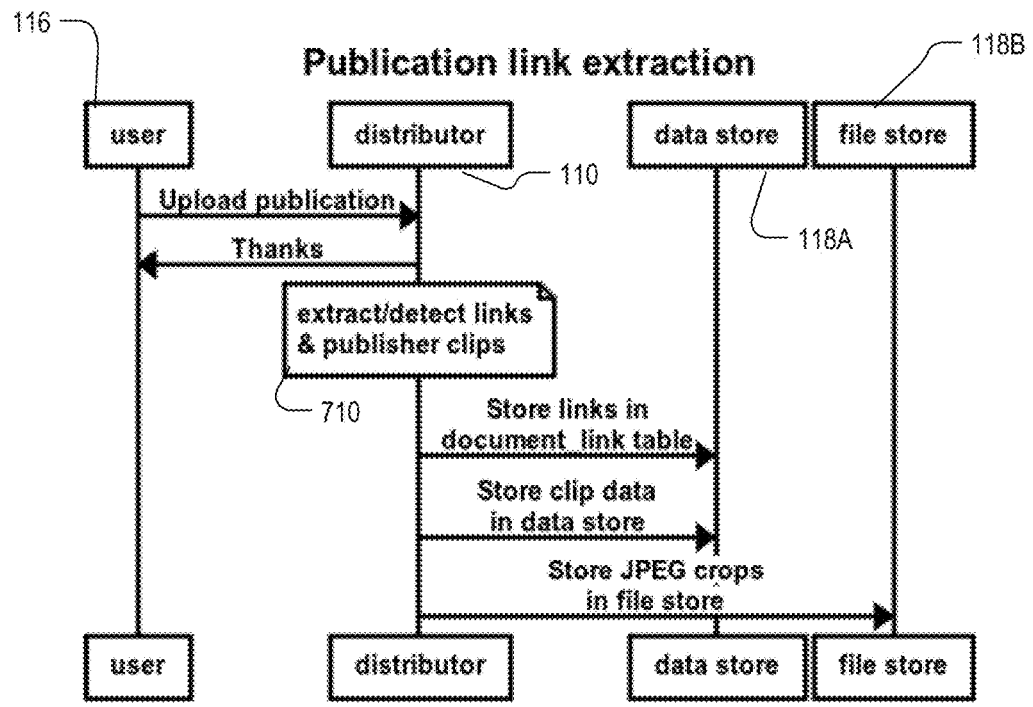

FIG. 7 is a sequence diagram for implementing step 310, in which a publisher creates and uploads a publication that includes publisher links and implicit links. Publisher links are presented to the user in a different color than user-created clips, and are displayed above any user-created clips.

Initially, the publisher inserts publisher-defined links into the publication. As mentioned above, in one embodiment the publisher does this using a program provided by the distributor, whereas in another embodiment it is done using tools on the distributor's publisher-facing website. Other variations will be apparent to the reader. The publisher then uploads the publication to the distributor system 110 using the distributor's publisher-facing website. The distributor 110 responds with a thank you message. In addition to publisher-defined links, the publication may also include implicit links. In step 710, the distributor 110 computer system processes the uploaded publication through a conversion pipeline that, among other things, detects and extracts the publisher-defined links and any implicit links. Explicit and implicit links are written into a link table in the data store 118A as described below. If any publisher-defined links have an associated clip region, the cropped versions of associated clip images may be created and written into the file store 118B.

Figure 8:
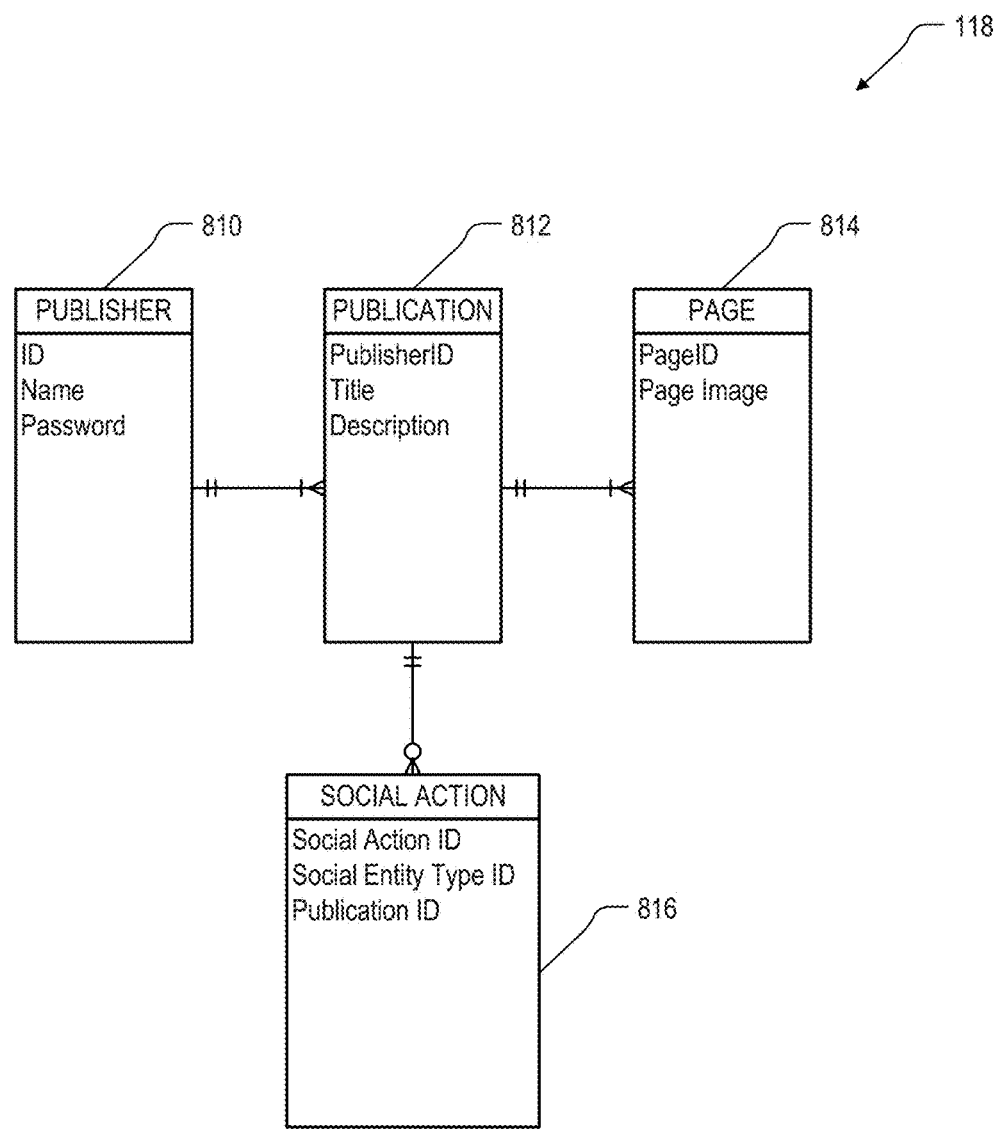
FIGS. 8 and 9 together illustrate the structure of pertinent parts of publication database in one embodiment.
Figure 9:
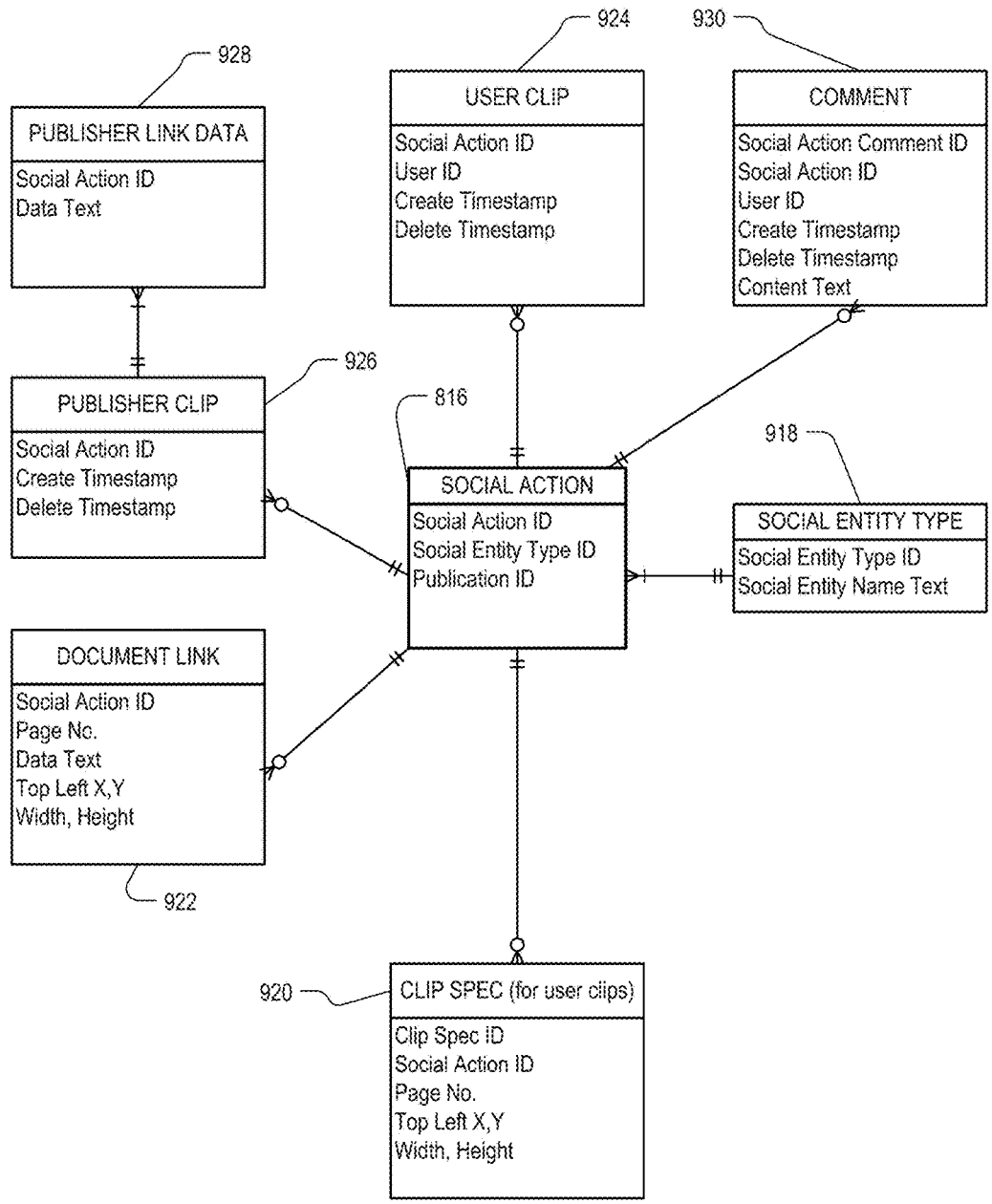

FIGS. 8 and 9 together illustrate the structure of pertinent parts of publication database 118 in one embodiment. As used herein, the term "database" does not necessarily imply any unity of structure. For example, two or more separate databases, when considered together, still constitute a "database" as that term is used herein. For example, data store 118A and file store 118B can be considered separate databases, and can also be considered together as constituting the single database 118.

Four basic tables are shown in FIG. 8: a Publisher table 810, a Publication table 812, a Page table 814, and a Social Action table 816. The Publisher table 810 contains an entry for each publisher, and each entry contains fields for a Publisher ID, the publisher's name, and password. The Publisher table 810 also contains pointers from each publisher entry to one or more entries in Publication table 812.

Publication table 812 contains an entry for each publication (e.g. an issue of a magazine, or in some embodiments, all issues of a magazine). Each entry contains fields for the Publisher ID, the title of the publication, and a description. The Publication table 812 also contains pointers from each publication entry to one or more entries in Page table 814.

Page table 814 contains an entry for each page of a publication. Each entry contains a field identifying the Page ID, as well as a pointer to the page image. In the embodiment of FIG. 8, each page contains exactly one image, which occupies the entire page.

User-created clips, as well as explicit and implicit links in a publication, are all grouped together for the purposes of the database 118 as "Social Actions". Social Action table 816 contains an entry for each social action in a publication. Each entry contains a Social Action ID, a Social Entity Type ID, and the Publication ID. The social actions are shown in FIG. 8 as being associated with a publication generally, but as previously mentioned, in another embodiment they can be associated instead with individual pages in page table 814.

FIG. 9 shows several more tables associated with an entry in the Social Action table 816. Social Entity Type table 918 includes an entry for each of a number of sharing services supported by the distributor system 110. Each entry includes the social entity type ID and the name of the social entity in text, among other things not shown. The social entity type ID in a Social Action entry 816 can be converted to the name of the social entity by reference to table 918.

Clip Spec table 920 includes an entry for each Social Action entry which represents a user clip. The entry in Clip Spec table 920 includes a Clip Spec ID, the Social Action ID of the associated entry in the Social Action table 816, the page number of the clip, the position of the clip region on the page given by the X,Y coordinates of the top left corner of the clip region, and the size of the clip region given by its width and height.

Document Link table 922 is similar to the Clip Spec table 920, except for links in the publication rather than clips. Document Link table 922 includes an entry for each Social Action entry which represents an explicit or implicit link. Like an entry in Clip Spec table 920, each entry in Document Link table 922 includes the Social Action ID of the associated entry in the Social Action table 816, the page number of the clip within the publication, and data containing the link URL as text. In addition, each document link is assigned a bounding box, and its position on the page is given by the X,Y coordinates of the top left corner of the box. The size of the box is given by its width and height.

User Clip table 924 includes an entry for each Social Action entry which represents a user clip. The entry in User Clip table 924 includes the Social Action ID of the associated entry in the Social Action table 816, a user ID of the user who created the clip, as well as creation and deletion timestamps.

Similarly, Publisher Clip table 926 includes an entry for each Social Action entry which represents a publisher clip. Publisher clips are created by the publisher 120 using the distributor 110 publisher-facing website 128, after a publication has already been uploaded. Unlike user clips, publisher clips typically include a hyperlink. The entry in Publisher Clip table 926 includes the Social Action ID of the associated entry in the Social Action table 816, as well as creation and deletion timestamps. Each entry in Publisher Clip table 926 is also associated with one or more entries in a Publisher Link Data table 928, which includes in each entry the Social Action ID of the associated entry in the Social Action table 816, as well as textual data containing the link URL.

Comment table 930 contains the comments associated with a Social Action entry. Each entry in the Social Action table 816 can be associated with zero or more entries in the Comment table 930. The database 118 in principle allows commenting on any type of social action, though in one embodiment the user interface can block commenting on certain types of social actions, such as links. Each entry in Comment table 930 includes a Social Action Comment ID, the Social Action ID of the associated entry in the Social Action table 816, the ID of the user that created the comment, creation and deletion timestamps, and the text of the comment.

Figure 10:
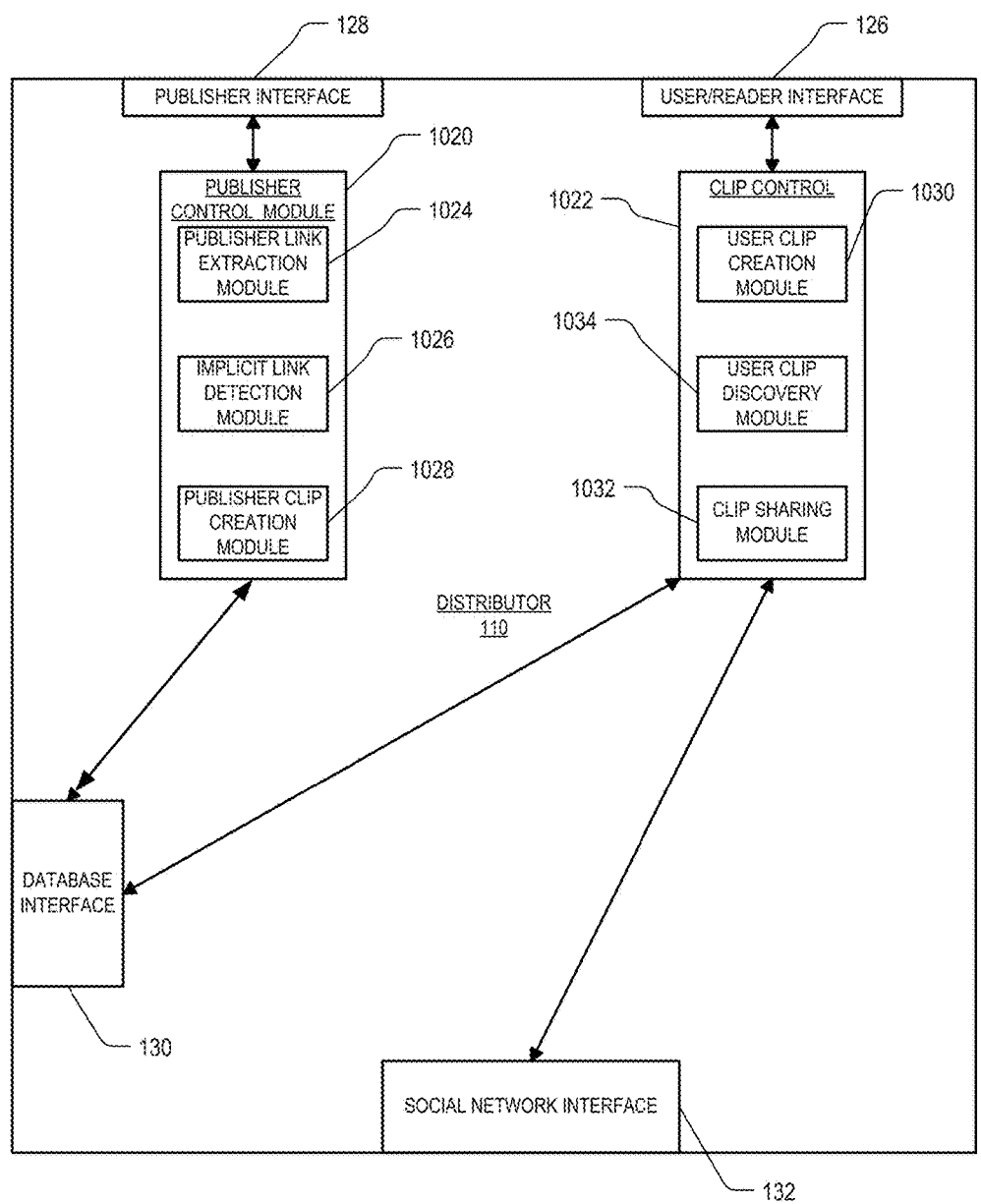
FIG. 10 is a simplified block diagram of functional modules in the distributor system of FIG. 1.

FIG. 10 is a simplified block diagram of functional modules in the distributor system 110 of FIG. 1. In one embodiment the modules in FIG. 10 are implemented as software code portions, which when executed by a processor will perform the functions indicated. In another embodiment they are implemented as separate units of hardware. In still another embodiment some of the modules are implemented as software code portions and others are implemented in hardware. A module that includes software code portions can be made of sub-modules containing sub-portions of the software code portions, and the sub-modules do not need to be contiguous.

The distributor system 110 includes a publisher interface 128 for communicating with the publisher system 120, a user/reader interface 126 for communicating with the user's computer system 116, and a database interface 130 for communicating with the publication database 118. It also includes publisher control module 1020 by which a publisher uploads an issue of the publication to the publication database and otherwise interacts with the distributer system 110, and a clip control module 1022 by which a user interacts with the system 110. The publisher control module 1020 includes a publisher link extraction module 1024 and an implicit link detection module 1026, which both operate in the conversion pipeline that extracts, among other things, implicit and explicit publisher-crated links. Publisher control module 1020 also includes a publisher clip creation module 1028 by which the publisher can create publisher clips in a previously uploaded publication. Clip control module 1022 includes a user clip creation module 1030 by which users can create new clips, and a clip sharing module 1032 by which users share clips on a sharing service. It also includes a user clip discovery module 1034 by which the user can search for desired clips or clip comments.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. Further, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A sharing method, for use with a publication database containing a plurality of publications, comprising:
a computer system serving toward a first user a first page from a selected publication, the first page including a first image;
responsive to behavior by the first user selecting a first clip region of the first image which is smaller than the full first image, a computer system:
writing first clip data to the publication database, the first clip data including an identification of a position of the first clip region on the first page and a first cropped version of the first image cropped to the first clip region, and
forwarding to a first sharing service a sharing service identification of the first clip region;
responsive to first user entry of a first comment for the first clip region, a computer system writing the first comment to the publication database in association with the first clip data;
a computer system serving the first page toward a second user responsive to a request by the second user, the first page including an indication of the presence of the first clip region thereon;
responsive to a request by the second user for the first clip region, a computer system serving toward the second user the first cropped version of the first image and the first comment, wherein the first clip region and the first comment are discoverable by other users; and
responsive to receipt of a second publication uploaded from a publisher, a computer system:
writing the second publication to the publication database,
detecting a second clip region on a second page in the second publication, the second clip region being smaller than the second page, and
writing second clip data to the publication database, the second clip data specifying a position of the second clip region on the second page, and an image of the second page cropped to the second clip region,
wherein the second publication includes a markup which identifies the second clip region and comprises a predefined associated target URL,
wherein the second clip region is discoverable by other users,
wherein the second clip region is created by the publisher and is associated with a publisher defined link, wherein publisher defined links are presented in a different color than a user-created clip and are displayed above any user-created clips.

2. The method of claim 1, further comprising:
a computer system serving the first page toward the second user;
responsive to behavior by the second user selecting a second clip region of the first image which is smaller than the full first image, a computer system: writing second clip data to the publication database, the second clip data including an identification of a position of the second clip region on the first page and a second cropped version of the first image cropped to the second clip region, and
forwarding to a second sharing service a sharing service identification of the second clip region; and
responsive to second user entry of a second comment for the second clip region, a computer system writing the second comment to the publication database in association with the second clip data,
wherein the second clip region and the second comment are discoverable by other users.

3. The method of claim 1, further comprising:
responsive to entry by the second user of a second comment for the first clip region, a computer system writing the second comment to the publication database in association with the first clip data.

4. The method of claim 3, further comprising:
a computer system serving the first page toward a third user responsive to a request by the third user,
responsive to a request by the third user for the first clip region, a computer system serving toward the third user the first cropped version of the first image and both the first and second comments.

5. The method of claim 1, further comprising:
responsive to the second user selection of a shared clip region at the first sharing service, a first computer system receiving a request from the first sharing service identifying the first clip region;
responsive to receiving the request from the first sharing service identifying the first clip region, the first computer system serving toward the second user the first cropped version of the first image and the first comment.

6. The method of claim 5, further comprising, responsive to receiving the request from the first sharing service identifying the first clip region, the first computer system serving the first page toward the second user, the first page including an indication of the presence of the first clip region thereon,
and wherein serving toward the second user the first cropped version of the first image and the first comment is performed responsive to a request by the second user after being served the first page.

7. The method of claim 5, further comprising:
responsive to entry by the second user of a second comment for the first clip region, a computer system writing the second comment to the publication database in association with the first clip data.

8. The sharing method of claim 1 wherein the step of forwarding to a first sharing service a sharing service identification of the first clip region is additionally responsive to behavior by the first user to select the first sharing service.

9. The method of claim 1, further comprising:
a computer system serving the first page toward a third user;
responsive to behavior by the third user selecting a second clip region of the first image which is smaller than the full first image, a computer system: writing second clip data to the publication database, the second clip data including an identification of a position of the second clip region on the first page and a second cropped version of the first image cropped to the second clip region, and
forwarding to a second sharing service a sharing service identification of the second clip region; and
responsive to third user entry of a second comment for the second clip region, a computer system writing the second comment to the publication database in association with the second clip data,
wherein the second clip region and the second comment are discoverable by other users.

10. A system comprising:
(A) a publication database containing data, for each of a plurality of publications, defining a plurality of visually perceptible elements, which visually perceptible elements correspond to a plurality of pages of the publications,
  (1) wherein each of the pages belongs to one of the publications,
  (2) and wherein at least one of the pages contains an image; and
(B) a computer server including a computer server processor coupled to the publication database, the computer server processor programmed to:
  (1) serve toward a first user a first page from a selected publication, the first page including a first image,
  (2) responsive to behavior by the first user selecting a first clip region of the first image which is smaller than the full first image:
    (a) write first clip data to the publication database, the first clip data including an identification of a position of the first clip region on the first page and a first cropped version of the first image cropped to the first clip region; and
    (b) forward to a first sharing service a sharing service identification of the first clip region,
  (3) responsive to first user entry of a first comment for the first clip region, write the first comment to the publication database in association with the first clip data, and
  (4) responsive to receipt of a second publication uploaded from a publisher:
    (a) write the second publication to the publication database;
    (b) detect a second clip region on a second page in the second publication, the second clip region being smaller than the second page; and
    (c) write the second clip data to the publication database, the second clip data including an identification of the second page, a position of the second clip region on the second page, and an image of the second page cropped to the second clip region,
wherein the first and second clip regions and the first comment are discoverable by other users,
wherein the second publication includes a markup which identifies the second clip region and comprises a predefined associated target URL,
wherein the second clip data further includes the target URL,
wherein the detection of a second clip region comprises detection of the markup,
wherein a computer server is programmed to determine at least some of the second clip data, including the target URL, from the markup,
and wherein the second clip region is created by the publisher and is associated with a publisher defined link, wherein publisher defined links are presented in a different color than a user-created clip and are displayed above any user-created clips.

11. The system of claim 10, wherein the first image occupies the entire first page.

12. The system of claim 10, wherein the first clip data further includes an identification of the first page.

13. The system of claim 10, wherein the forward to the first sharing service is performed responsive to user selection by the first user of the first sharing service from among a choice of more than one sharing service.

14. The system of claim 10, wherein the forward to the first sharing service further includes forwarding to the first sharing service the cropped version of the first image.

15. The system of claim 10, wherein the computer server processor is further programmed to:
serve the first page toward a second user;
responsive to behavior by the second user selecting a second clip region of the first image which is smaller than the full first image:
  write second clip data to the publication database, the second clip data including an identification of a position of the second clip region on the first page and a second cropped version of the first image cropped to the second clip region, and
  forward to a second sharing service an identification of the second clip region; and
responsive to second user entry of a second comment for the second clip region, write the second comment to the publication database in association with the second clip data,
wherein the second clip region and the second comment are discoverable by other users.

16. The system of claim 15, wherein the first and second sharing services are different.

17. The system of claim 10, further comprising:
a computer server serving the first page toward a second user responsive to a request by the second user, the first page including an indication of the presence of the first clip region thereon,
responsive to a request by the second user for the first clip region, a computer server serving toward the second user the first cropped version of the first image and the first comment.

18. The system of claim 17, wherein a computer server is programmed to, responsive to entry by the second user of a second comment for the first clip region, write the second comment to the publication database in association with the first clip data.

19. The system of claim 18, wherein a computer server is programmed to:
serve the first page toward a third user responsive to a request by the third user, and
responsive to a request by the third user for the first clip region, serve toward the third user the first cropped version of the first image and both the first and second comments.

20. The system of claim 17, wherein the first and second users are different.

21. The system of claim 10, wherein a computer server is programmed to, responsive to receiving a request from the first sharing service identifying the first clip region and further pointing towards a second user who selected the first clip region at the first sharing service, serve toward the second user the first cropped version of the first image and the first comment.

22. The system of claim 21, wherein a computer server is programmed to, responsive to receiving the request from the first sharing service identifying the first clip region, serve the first page toward the second user, the first page including an indication of the presence of the first clip region thereon,
and wherein the serving toward the second user the first cropped version of the first image and the first comment is performed responsive to a request by the second user after being served the first page.

23. The system of claim 21, wherein a computer server is programmed to, responsive to entry by the second user of a second comment for the first clip region, write the second comment to the publication database in association with the first clip data.

24. The system of claim 10, wherein the second publication includes URL text in the second image,
    and wherein detection of a second clip region comprises detection of the URL text and defining the second clip region as a region of the second image bounding the URL text,
    and wherein the second clip data further includes the URL.

25. The system of claim 10 wherein forwarding to a first sharing service a sharing service identification of the first clip region is additionally responsive to behavior by the first user to select the first sharing service.

\* \* \* \* \*